United States Patent Office 3,341,408
Patented Sept. 12, 1967

3,341,408
AUGMENTING 5-OXYTETRACYCLINE AVIAN BLOOD LEVELS AND FEED SUPPLEMENTS WITH SELECTED CYCLIC PHOSPHATES
Chung Yu Shen, Olivette, Mo., assignor to Monsanto Company, St. Louis, Mo., a corporation of Delaware
No Drawing. Filed Mar. 4, 1965, Ser. No. 437,264
9 Claims. (Cl. 167—53.1)

This application is a continuation-in-part of copending application Ser. No. 242,598 filed Dec. 6, 1962, now abandoned.

This invention relates to tetracyclic antibiotics and to procedures for using them effectively. More specifically, the invention is directed to the use of tetracycline antibiotics in the control of bacteria and other pathogenic organisms in the bodies of higher animals, particularly birds and mamals. More specifically, the invention relates to animal feeds containing tetracycline antibiotics in an effective formulation.

When a living organism ingests a tetracycline antibiotic, especially tetracycline, 5-oxyeteracycline or 7-chlorotetracycline, it enters the body fluids and becomes active in the control of parasitic bacteria and other pathogens present in the said fluid. Often the control of these organisms depends upon a substantial concentration of the antibiotic in the body fluid, especially in the bood. In some instances, the effective concentration can be attained by increasing the quantity charged to the feed, but this procedure is often not desirable because of the cost of the tetracycline antibiotic and because of the inefficient utilization of the additional amount. By analytical procedures the concentration in the blood can be determined and this is a measure of the degree of protection which the host animal is receiving from the antibiotic. If the animal is seriously infected the use of the antibiotics may be manifested by a growth response or an improvement in feed efficiency.

The availability of the tetracycline antibiotics and the concentration in the blood may under certain conditions be influenced by other food components. Soluble calcium compounds inhibit the assimilation of the antibiotics and it is desirable to keep them at a minimum by either reducing the calcium content or by substituting very insoluble compounds, such as calcium sulfate, for the more soluble calcium carbonate and limestone usually used. The inhibiting effect of calcium can also be minimized by the addition of alkali metal salts whereby the objectionable calcium ions are replaced by sodium or potassium. Salts, such as trisodium orthophosphate ($Na_3PO_4$), disodium orthophosphate ($Na_2HPO_4$), monosodium orthophosphate ($NaH_2PO_4$) and the corresponding potassium and ammonium salts may be incorporated in the animal feeds.

The pharse "tetracycline antibiotics" as used in this specification and the appended claims is intended to have a generic significance and includes a variety of compounds which have antimicrobial activity and have similar structures to which have been assigned the generic name "tetracycline" by the Chemical Abstracts Nomenclature (S.A.C.S. 74, 4976). Many of the tetracycline antibiotics are produced by culturing certain fungi and separating the bacterial active compounds produced by the fungi. Other "tetracycline antibiotics" are synthesized by the chemical modification of naturally produced tetracycline antibiotics.

The tetracycline antibiotics will have the basic structure (1)

with substituents which may vary in position and kind.
The accepted nomenclature regards the tetracycline (achromycin) as being:

(2)

The substituted tetracyclines include:

Substituent: Amine name
5-OH _____ (Terramycin) 5-oxytetracycline
7-Cl _____ (Aureomycin) 7-chlorotetracycline
7-Br _____ 7-bromtetracycline Other homologues include:

6-deoxy-5-oxytetracycline
4-de(dimethylamino)-5-oxytetracycline
6-deoxytetracycline
6-deoxy-6-demethyltetracycline
6-methyl-7-chlorotetracycline
4-de(dimethylamino)tetracycline
4-de(dimethylamino)-7-chlorotetracycline
6-demethyltetracycline.

Other tetracyclines of the basic structure are:

4-dimethylamino-1,4,4a,5,7,8,9,10-decanhydro-3,11,12a-trihydroxy-6-methyl-1,10-dioxo-2-naphthacenecarboxamide
Carboxamido-N-(isopropyl)-6-deoxy-7-chlorotetracycline
6-demethyl-12a-deoxyanhydrotetracycline
5a-epitetracycline
6-methylene-5-oxytetracycline
6-demethyl-7-chlorotetracycline
7-bromo-6-dimethyl-6-deoxytetracycline
8-12a-dibromo-1,4,4a,5,12,12a-hexahydro-3,10,11,-tri-hydroxy-6-methyl-1,12-dioxo-2-naphthacenecarboxamide.

Other compounds containing the basic configuration (1) and their water-soluble salts are also embraced by the term "tetracycline antibiotics." The use of all of these compounds in the control of parasitic bacteria and other pathogens, and especially in the body fluids is well known and not part of this invention. It is also known that the tetracycline antibiotics enter the bloodstream and that the concentration of the antibiotics in the blood is a measure of the ability of the animal to resist the deleterious effects of the bacteria. Furthermore, it is known that by increasing the quantity of the antibiotic introduced in the digestive tract, the concentration in the bloodstream can be increased.

It has been found that by the concurrent introduction of certain chemicals greatly increased antibiotic concentrations in the blood will occur. Although the phenomenon of antibiotic potentiation is known, the compounds used in this manner are not greatly effective and provide only minimal beneficial effects. The primary purpose is to provide compositions which when fed to animals will induce high levels of the tetracycline antibiotics in the bloodstream. A further purpose is to provide a procedure which will enable the animals to become more resistant to harmful bacteria and will provide for a more defficient use of the antibiotic.

It is known that terephthalic acid when ingested with the tetracycline antibiotics aids in the assimilation of the antibiotic, such that the concentration of the antibiotic in the blood is substantially increased. Much experimental work has been done and many observations have been made with respect to the desirable antibiotic potentiation effect of terephthalic acid. Compounds with equivalent potentiation effects will have unquestionable utility, because terephthalic acid is believed to have deleterious effects on animals. Compounds of even less effect may be useful because the feed industry is still hopeful that new antibiotic potentiators may avoid the disadvantages inherent in the use of terephthalic acid.

It has now been found that certain cyclic phosphates provide useful antibiotic potentiation effects. The introduction of the tetracycline antibiotics into the digestive system of animals will induce a substantially greater concentration of the antibiotic in the blood serum, if there is present in the digestive system a compound of the structure

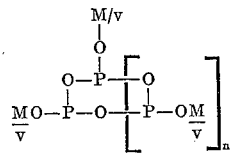

where M is selected from nontoxic metal ions of the group consisting of alkali metal, alkaline earth metal, iron and hydrogen, provided that at least one of the M symbols is other than hydrogen; wherein $v$ is the valence of M; and wherein $n$ is an integer from one to ten. Of particular importance are the cyclic metaphosphates wherein each M represents the same or different elements above defined. Typical examples of the useful phosphates are $Na_3H(PO_3)_4$, $Na_3K(PO_3)_4$, $Na_3(PO_3)_3$, $(Ca/2)_3(PO_3)_3$, $Na_2K_2(PO_3)_4$, $Ca/2H_3(PO_3)_4$, $FeH(PO_3)_4$, $FeNa_2(PO_3)_4$, $CaFe(PO_3)_4$.

Although the cyclic phosphates and the tetracycline antibiotics may be introduced into the digestive system independent of a conventional feed stuff, either in combination or separately, the quantities of each component may vary widely. The precise biochemical mechanism is not fully understood, but it appears that the presence of the cyclic phosphate either aids in the transition of the antibiotic through the walls of the digestive organs or otherwise enables the blood or other body fluids to retain the antibiotic and thereby more effectively destroy parasitic microorganisms.

The most convenient method of use is to incorporate both the tetracycline antibiotic and the cyclic phosphate into the normal feed composition. It has been found that from about 50 to about 500 grams of the antibiotic and from about 1 to about 25 pounds of the cyclic phosphate, in a ton of feed formulation, include the practicable uses of the invention. Thus, on a weight basis, the compositions of the present invention contain between about 1 and about 250 parts of cyclic phosphate for each part of antibiotic. The preferred feed compositions for optimum and most economical antibiotic potentiation contain about 150 to about 300 grams of antibiotic per ton of feed and from about 5 to about 20 pounds of cyclic phosphates.

A very useful modification of the above-described procedures and feed formulations involves the simultaneous use or the additional incorporation of surface active agents.

The surfactants which can be used in the practice of this invention may be any of a large number of compounds which have both hydrophobic and hydrophilic properties. A wide variation of molecular configurations and chemical properties are possible. These surface active compounds may have cationic or anionic properties or may be neither cationic or anionic (nonionic). Some surface active agents may have both cationic and anionic functional configurations, which agents are known as ampholytic surfactants.

Several distinct types of anionic surfactants may be used, for example the straight chained naturally occurring fatty acids and their soaps. This type includes the fatty acids derived from animal and vegetable oils by the conventional saponification procedures, such as stearic acid, ricinoleic acid, margaric acid, lauric acid, myristic acid, palmitic acid, capric acid, caprylic acid, oleic acid, linoleic acid and linolenic acid, the alkali metal salts of these acids, particularly the sodium and potassium salts, the heavy metal soaps of these acids, such as the salts of metals such as lead, cobalt, manganese, Zn, nickel, aluminum, copper, iron and chromium, and the amino soaps, wherein the said acids are reacted with amines, for example as in triethylamine stearate, di-n-butylamine laurate and anilino palmitate.

Modified carboxylic acids of somewhat different properties may be made by substituting organic groups on the aliphatic chain, for example by oxidation which can take place on an unsaturated linkage to form a hydroxyl or epoxy group. Formic acid may be added to a double bond. By halogenation of the alpha carbon atom, hydroxylated alkyl substituents can be introduced. Halogenation on the unsaturated bonds provides a means of introducing side chains or functional groups. Other groups can be added directly to the double bond, for example formaldehyde will react with oleic acid to form a six-member oxygen heterocyclic substituent. A variety of other mixed carboxylic acids can be prepared by saponification of wool, wax, or by separation from tall oil. Other acids can be prepared from paraffins by oxidation to carboxy, keto and hydroxyl groups, accompanied by the formation of lower molecular weight compounds. These carboxylic acids may have intermediate groups such as ester, ether or sulfonyl. All of these modified carboxylic acids may be used as surface active agents or may be converted to salts of alkali and heavy metals.

Another group of anionic surfactants are the esters of sulfur acids, such as sodium lauryl sulfate, the various alkali metal alkylaryl sulfonates, for example sodium dedecylbendene sulfonate, sodium-2-ethylhexylnaphthyl sulfonate and sodium octadecyl benzene sulfonate. These and other sulfuric acid esters can be prepared by first reducing the acids, for example by sodium or by hydrogenation followed by sulfonation. Oxo alcohols and other synthetic alcohols such as keryl alcohols made by chlorination of kerosene, reacting with sodium benzoate and saponifying the resulting product; or the alcohol made by reaction of formaldehyde with triisobutylene may also be sulfated. Olefins or olefin polymers (polypropylenes and isobutylene polymers) may be sulfated directly. Ester alcohols and amido alcohols will by sulfonation procedures provide valuable surfactants. Many alkane sulfonates, for example octadecyl sulfonate, those prepared by oxidation of long chain alkyl mercaptans, those prepared by direct reaction of paraffin oils with $SO_3$ or chlorosulfonic acid are valuable anionic surfactants. Petroleum sulfonates known as mahogany or green soaps, by-products from the petroleum refining industry, are useful.

Other types of anionic surfactants are the phosphorus compounds such as di(2-ethylhexyl)orthophosphate or the acid phosphate esters of coco-monoethanolamide; sulfinic acid made by reduction of sulfonyl chlorides, the sulfonamides, the hydrogenated aromatization or polymerization of tall oil rosin acids, the lignin sulfonate by-products from the sulfite paper industry and the lignin sulfonates modified by controlled alkaline hydrolysis. These anionic surfactants have a long chain oil-soluble group and an ionizable acid or salt group to provide the anionic properties.

The useful surfactants for the practice of this invention also include many of the cationic types; for example, the fatty acid nitriles prepared by the reaction of ammonia and fatty acid under pressure at elevated temperatures, amines with or without intermediate esters, ether or amide linkages; the amino alcohols; allyl diamines; the alkyl anilines; the imidazolines made by condensing fatty acids with ethylene diamine; the quaternary nitrogen bases containing a long chain oil-soluble group and a ionizable acid group, usually chloride or bromide, such as tetradecyl pyridinium chloride; N-alkyl morpholine, which may be quaternized, for example with butyl bromide; the reaction product of pyridine and 2-chloroethyl dimethyl dodecyl ammonium chloride; the reaction products of tertiary amines and chloromethyl stearamide, the thiouronium salts, such as the reaction product of chlorinated paraffin and urea; and the phosphonium salts, such as higher alkyl bis(dimethylamino)phosphonium halides.

Another and a very important type of surfactant, which can be used, is that having neither anionic or cationic properties. These are called nonionic surfactants and include esters, ethers, alcohols and phenols which do not have ionizable substituents. They must have an oil-attractive long chain hydrocarbon group and a hydrophilic substituent which is nonionogenic. This type of surfactant includes polyhydroxy compounds such as the fatty acid esters of the polysaccharides, such as sucrose and dextrose; the fatty acid monoesters of glycols; esters of fatty acid monoglycerides and hydroxy acids, such as lactic or glycolic acids; and the glucose derivatives, for example the transesterification product of methyl glucoside and long chain fatty acid esters. The bulk of the nonionic surfactants are based on ethylene oxide or homologues thereof, wherein the hydrophilic properties are due to the presence of a plurality of ethoxy groups. Many of these are prepared by the condensation of a large excess of ethylene oxide on a nonionic hydrophobic phenol or alcohol, for example dodecylphenol, but they also can be prepared by reacting a long chain fatty acid with a large excess of ethylene oxide, which reacts with the ionogenic carboxy groups to form hydroxy ethyl esters, for example ethoxy (ethoxy)$_n$ stearate, and the ethylene oxide (9 mol) condensate with tetrapropylenebenzene sulfonic acid. An increase in the number of mols of ethylene oxide increases the hydrophilic properties. The nonionic surfactants may have in the hydrocarbon structure non-hydrocarbon groups such as tertiary amino nitrogen, sulfide, sulfone and ester groups. The intermediates for condensation with ethylene oxide have terminal groups such as hydroxyl, aldehyde, carboxyl, mercapto, sulfonic acid, sulfonamide, guanylurea, amino and amido. These will provide the necessary surface active properties.

One additional type of surfactants are the ampholytic compounds possessing both cationic and anionic groups, for example dodecyl-beta-aniline, amino carboxylic acids or salts, dimethylaminoethyl benzene sulfonic acid quaternized with an alkyl halide and the carboxylic acids containing imidazoline molecular grouping.

Frequently the surface active agents may be improved or otherwise modified by the incorporation of additives known as builders, such as pyrophosphates, tripolyphosphate, sodium silicates, clays, particularly the expanding lattice type silica gels, sodium zincates, collodial aluminum, hydroxide, ammonium carbonate, dicyandiamide sodium ferrocyanide.

Other surfactants and methods for their preparation and use are described in detail in the textbook "Surface Active Agents and Detergents," Schwartz, Perry and Berch, Interscience Publishers Inc. (1958). The word "surfactants" is used to define the broad class, all of which appear to aid the absorption of the tetracycline antibiotics and transfer from the digestive system into the bloodstream.

*Example 1*

Three to four week old chicks were maintained with an antibiotic-free diet. On the day of testing each bird is weighed and given about 75 mg. of 5-oxytetracycline per kg. of body weight and about 400 mg. of the sodium salt of cyclic metaphosphate. Three hours after the administration of the antibiotic and phosphate, 2 ml. of blood is withdrawn from each bird by heart puncture. Similar blood samples were withdrawn from birds fed terephthalic acid in place of the cyclic phosphate. In each test group the blood from three chicks was pooled and centrifuged; the sera were assayed for antibiotic content. The content in the phosphate potentiated blood was 145% of the content in blood potentiated with terephthalic acid.

*Example 2*

The procedure of Example 1 was repeated except sodium polyphosphate was used in place of the cyclic phosphate. It was found that the potentiation effect was only 80% of the potentiation obtained with terephthalic acid.

*Example 3*

Chicks were fed for one week with a diet containing about 0.2% of 5-oxytetracycline. Other groups of chicks were fed the same diet with varying proportions of cyclic sodium metaphosphate, about 0.375%, 0.50% and 0.75%. At the end of the test period, samples of blood were taken and assayed for antibiotic content. The following data was observed:

| Percent phosphate in diet | Antibiotic in blood, microgram per ml. | Percent of control |
|---|---|---|
| 0.0 | .306 | |
| 0.375 | .420 | 137 |
| 0.50 | .360 | 148 |
| 0.75 | .465 | 152 |

Although the invention is described with respect to specific embodiments, it is not intended that the details thereof shall be limitations upon the scope of the invention except to the extent incorporated therein.

What is claimed is:

1. A method of augmenting avian blood levels of 5-oxytetracycline which comprises feeding birds a mixture of one part by weight of 5-oxytetracycline and from about one to about 250 parts by weight of a cyclic phosphate of the formula:

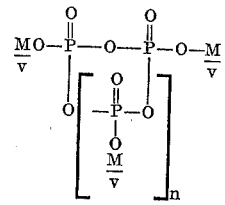

wherein $n$ is an integer from one to two; M is a nontoxic metal of $v$ valence selected from the group consisting of alkali metals, alkaline earth metals, hydrogen and iron, provided that at least one M is a metal; and $v$ is an integer from one to three.

2. A method of augmenting avian blood levels of 5-oxytetracycline which comprises feeding birds a mixture of one part by weight of 5-oxytetracycline and from about one to about 250 parts by weight of a cyclic trimetaphosphate.

3. A method of augmenting avian blood levels of 5-oxytetracycline which comprises feeding birds a mixture of one part by weight of 5-oxytetracycline and between about one and about 250 parts by weight of a cyclic tetrametaphosphate.

4. A composition for augmenting avian blood levels of 5-oxytetracycline comprising one part by weight of 5-oxytetracycline and from about one to about 250 parts by weight of a cyclic phosphate of the formula:

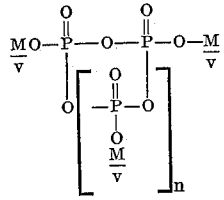

wherein $n$ is an integer from one to two; M is a non-toxic metal of $v$ valence selected from the group consisting of alkali metals, alkaline earth metals, hydrogen and iron, provided that at least one M is a metal; and $v$ is an integer from one to three.

5. A composition for augmenting avian blood levels of 5-oxytetracycline comprising one part by weight of 5-oxytetracycline and from about one to about 250 parts by weight of a cyclic trimetaphosphate.

6. A composition for augmenting avian blood levels of 5-oxytetracycline comprising one part by weight of 5-oxytetracycline and from about one to about 250 parts by weight of a cyclic tetrametaphosphate.

7. An avian feed supplement comprising one part by weight of 5-oxytetracycline and from about one to about 250 parts by weight of a cyclic phosphate of the formula:

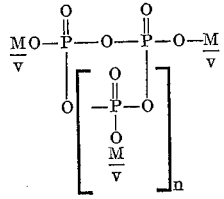

wherein $n$ is an integer from one to two; M is a non-toxic metal of $v$ valence selected from the group consisting of alkali metals, alkaline earth metals, hydrogen and iron, provided that at least one M is a metal; and $v$ is an integer from one to three.

8. An avian feed supplement comprising one part by weight of 5-oxytetracycline and from about one to about 250 parts by weight of a cyclic trimetaphosphate.

9. An avian feed supplement comprising one part by weight of 5-oxytetracycline and from about one to about 250 parts by weight of a cyclic tetrametaphosphate.

References Cited
UNITED STATES PATENTS

| | | | |
|---|---|---|---|
| 2,791,609 | 5/1957 | Kaplan | 260—559 |
| 2,795,528 | 6/1957 | Buckwalter et al. | 167—55 |
| 2,806,789 | 9/1957 | Kiser et al. | 99—2 |
| 3,053,892 | 9/1962 | Sieger et al. | 260—559 |
| 3,074,849 | 1/1963 | Buckwalter et al. | 167—65 |
| 3,121,634 | 2/1964 | Kichline et al. | 99—2 |
| 3,159,537 | 12/1964 | Takesue et al. | 167—55 |
| 3,236,736 | 2/1966 | Fitch et al. | 167—53.1 |

LEWIS GOTTS, *Primary Examiner.*

S. K. ROSE, *Assistant Examiner.*